(12) United States Patent
Mukul

(10) Patent No.: US 12,547,446 B2
(45) Date of Patent: Feb. 10, 2026

(54) COMPUTING DEVICE CONTROL OF A JOB EXECUTION ENVIRONMENT BASED ON PERFORMANCE REGRET OF THREAD LIFECYCLE POLICIES

(71) Applicant: Adobe Inc., San Jose, CA (US)

(72) Inventor: Reetesh Mukul, Bangalore (IN)

(73) Assignee: Adobe Inc., San Jose, CA (US)

( * ) Notice: Subject to any disclaimer, the term of this patent is extended or adjusted under 35 U.S.C. 154(b) by 1107 days.

(21) Appl. No.: 17/350,448

(22) Filed: Jun. 17, 2021

(65) Prior Publication Data

US 2022/0405124 A1   Dec. 22, 2022

(51) Int. Cl.
| | |
|---|---|
| *G06F 9/48* | (2006.01) |
| *G06F 9/50* | (2006.01) |
| *G06N 3/0442* | (2023.01) |
| *G06N 3/0455* | (2023.01) |
| *G06N 3/092* | (2023.01) |
| *G06N 5/01* | (2023.01) |
| *G06N 20/00* | (2019.01) |

(52) U.S. Cl.
CPC .......... *G06F 9/4881* (2013.01); *G06F 9/5038* (2013.01); *G06F 9/5044* (2013.01); *G06N 20/00* (2019.01); *G06F 9/485* (2013.01); *G06F 9/5066* (2013.01); *G06F 9/5094* (2013.01); *G06F 2209/5011* (2013.01); *G06F 2209/5018* (2013.01); *G06N 3/0442* (2023.01); *G06N 3/0455* (2023.01); *G06N 3/092* (2023.01); *G06N 5/01* (2023.01)

(58) Field of Classification Search
CPC .... G06F 9/4881; G06F 9/5038; G06F 9/5044; G06F 9/485; G06F 9/5094; G06F 9/5066; G06F 2209/5011; G06F 2209/5018; G06N 20/00; G06N 3/0442; G06N 3/0455; G06N 3/092; G06N 5/01
See application file for complete search history.

(56) References Cited

U.S. PATENT DOCUMENTS

| | | | |
|---|---|---|---|
| 9,870,257 B1 * | 1/2018 | Gong | G06F 9/4881 |
| 2013/0054808 A1 * | 2/2013 | Hildebrand | H04L 67/1001 |
| | | | 709/226 |
| 2013/0282853 A1 * | 10/2013 | Jun | G06F 9/544 |
| | | | 709/213 |

(Continued)

OTHER PUBLICATIONS

"Thread (Computing)" https://en.wikipedia.org/wiki/Thread_(computing). Accessible on Jan. 6, 2020 (Year: 2020).*

(Continued)

*Primary Examiner* — Michael W Ayers
(74) *Attorney, Agent, or Firm* — FIG. 1 Patents

(57) ABSTRACT

Job execution environment control techniques are described to manage policy selection and implementation to control use of job executors by a computing device, automatically and without user intervention. These techniques are usable to select a policy from a plurality of policies that is then used to control lifecycles of job executors of a job execution environment of a computing device. Further, these techniques are usable to respond dynamically to change the selected policy during runtime of the application in response to changes in the job execution environment.

20 Claims, 10 Drawing Sheets

(56) References Cited

U.S. PATENT DOCUMENTS

| | | | | |
|---|---|---|---|---|
| 2015/0160970 | A1* | 6/2015 | Nugteren | G06F 8/451 718/102 |
| 2015/0169383 | A1* | 6/2015 | van den Berghe | G06F 11/3409 718/104 |
| 2015/0195157 | A1* | 7/2015 | Nayyar | H04L 41/0681 709/224 |
| 2016/0357565 | A1* | 12/2016 | Greenhalgh | G06F 1/3243 |
| 2017/0132042 | A1* | 5/2017 | Cherkasova | G06F 9/5077 |
| 2017/0257452 | A1* | 9/2017 | Hoiles | G06N 3/08 |
| 2018/0121366 | A1* | 5/2018 | Tian | G06F 9/45558 |
| 2019/0188034 | A1* | 6/2019 | Lloyd | G06F 9/5027 |
| 2020/0065712 | A1* | 2/2020 | Wang | G06N 20/20 |
| 2021/0382744 | A1* | 12/2021 | Tang | G06F 11/3006 |
| 2022/0137149 | A1* | 5/2022 | Chueh | B60L 58/12 702/63 |
| 2022/0147390 | A1* | 5/2022 | Akinapelli | G06F 11/3433 |

OTHER PUBLICATIONS

Agarwal et al. "Taming the Monster: a Fast and Simple Algorithm for Contextual Bandits". Copyright 2014 (Year: 2014).*

"Bose-Einstein statistics", Wikipedia, The Fee Encyclopedia [online][retrieved May 26, 2021]. Retrieved from the Internet <https://en.wikipedia.org/wiki/Bose%E2%80%93Einstein_statistics>., 12 pages.

"Fermi-Dirac statistics", Wikipedia, The Free Encyclopedia [online][retrieved May 26, 2021]. Retrieved from the Internet <https://en.wikipedia.org/wiki/Fermi%E2%80%93Dirac_statistics>., 11 pages.

"Partition (number theory)", Wikipedia, The Free Encyclopedia [online][retrieved May 26, 2021]. Retrieved from the Internet <https://en.wikipedia.org/wiki/Partition_(number_theory)>., 11 pages.

"PyTorch C++ API Master Documentation", PyTorch [online][retrieved May 19, 2021]. Retrieved from the Internet <https://pytorch.org/cppdocs/#pytorch-c-api>., 3 pages.

"Std::latch", cppreference.com [online][retrieved May 13, 2021]. Retrieved from the Internet <https://en.cppreference.com/mwiki/index.php?title=cpp/thread/latch&printable=yes>., Feb. 14, 2020, 2 pages.

"The Upper Confidence Bound Algorithm", Bandit Algorithms Blog [online][retrieved May 19, 2021]. Retrieved from the Internet <https://banditalgs.com/2016/09/18/the-upper-confidence-bound-algorithm/>., Sep. 18, 2016, 24 pages.

"Thread pool", Wikipedia, The Free Encyclopedia [online][retrieved May 26, 2021]. Retrieved from the Internet <https://en.wikipedia.org/wiki/Thread_pool>., 3 pages.

"Turnstile", Wikipedia, The Free Encyclopedia [online][retrieved May 26, 2021]. Retrieved from the Internet <https://en.wikipedia.org/wiki/Turnstile>., 5 pages.

Lattimore, Tor et al., "Bandit Algorithms", Cambridge, England, Cambridge University Press [retrieved May 13, 2021]. Retrieved from the Internet <https://tor-lattimore.com/downloads/book/book.pdf>., Jul. 16, 2020, 596 pages.

Shrivastava, Saurabh, "Reinforcement Learning for Scheduling Threads on a Multi-Core Processor", [retrieved May 19, 2021]. Retrieved from the Internet <http://cs229.stanford.edu/proj2010/Shrivastava- ReinforcementLearningForSchedulingThreadsOnAMultiCoreProcessor.pdf>., 2010, 5 pages.

* cited by examiner

800

BTP-GTRM Algorithm $N$ := Number of Threadpools
$\mathbb{T}$ := $[\mathfrak{T}^k]$ where $k \in [N]$ is a set of Threadpools.
$\mu$ := array of $N$ elements representing reward means
weights := array of $N$ elements
hpt := history of performance tuple (last 10 performance tuples).
$\epsilon$ := explore probability
$\delta$ := $1/(n^2), n \geq 100$
$T$ := array of $N$ elements with $T[p]$ represents the number of times $\mathfrak{T}^p$ is run.
$\gamma$ := discounted reward factor

```
for epochs = 1,2,... do /* epochs can terminate or they can keep running*/
    for i = 1...10 do /* each epoch constitutes a cycle of 10 sub-iterations*/
        explore ← sample from Bernoulli distribution B(ε)
        t ← (epochs - 1) × 10 + i /*horizon*/
        if not explore then
            p ← argmax_j UCB(j, t)
        elif
            p ← D([sample from N(·|weights[j], 1) | j = 1...N])
            /* D(S) is discrete distribution over 1,2,..N values with S
            being the weight*/
        end
```

$(\overline{R_T}, R, [T], [\mathbb{T}], W) \leftarrow \mathfrak{T}^p::\text{run}(...)$ /* Threadpool p is run*/
$T[p] \leftarrow T[p] + 1$
$\mu[p] \leftarrow \gamma\mu[p] + \frac{1}{T[p]}[-\gamma\mu[p] + (1-\gamma)W]$ pt ← $(\overline{R_T}, R, [T], [\mathbb{T}], \mu)$
hpt ← pt /*push pt in hpt. pop first element from hpt if its size crosses 10*/ weights ← GTRM::predict(pt)

end for

GTRM::train(hpt)
end for

Fig. 8

COMPUTING DEVICE CONTROL OF A JOB EXECUTION ENVIRONMENT BASED ON PERFORMANCE REGRET OF THREAD LIFECYCLE POLICIES

BACKGROUND

Computing device functionality continues to increase in part by harnessing underlying hardware parallelism of a job execution environment implemented by the computing device. This is often realized through increases in hardware functionality such as to increase a number of processing cores supported by processors of a processing system to support increasing numbers of parallel operations in the job execution environment. However, increases in hardware parallelism and software that is used to support this parallelism introduces numerous challenges in the operation of the computing device.

In one such example, application programmers use threadpools to manage underlying hardware parallelism of threads implemented by respective cores of a processor. Conventionally, this is performed by manually specifying a policy that is used to control a lifecycle of threads in the threadpool, e.g., creation and termination of respective threads for use by an application during execution. In instances in which an underlying structure and operation of the application is homogenous and uniform, a policy is typically estimated as a fixed constant or in terms of a non-stochastic algorithm. However, even in instances in which the structure and operation of the application is homogenous and uniform, complexities arise due to differences in underlying hardware and software utilized by the job execution environment. This challenge is further compounded as complexity of the application increases, oftentimes in ways that are not readily determinable by the application programmer, e.g., due to use of shared resources that can make increases in parallelism less efficient in the operation of the computing device. Accordingly, conventional techniques often fail and result in inefficient use of computational resources and increases in latency.

SUMMARY

Job execution environment control techniques are described to manage policy selection and implementation to control use of job executors by a computing device, automatically and without user intervention. These techniques are usable to select a policy from a plurality of policies that is then used to control lifecycles of job executors of a job execution environment of a computing device. Further, these techniques are usable to respond dynamically to change the selected policy during runtime of the application in response to changes in the job execution environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 depicts an example algorithm implementing regret and a multi-armed bandit technique together.

DETAILED DESCRIPTION

Overview

Figure 1:
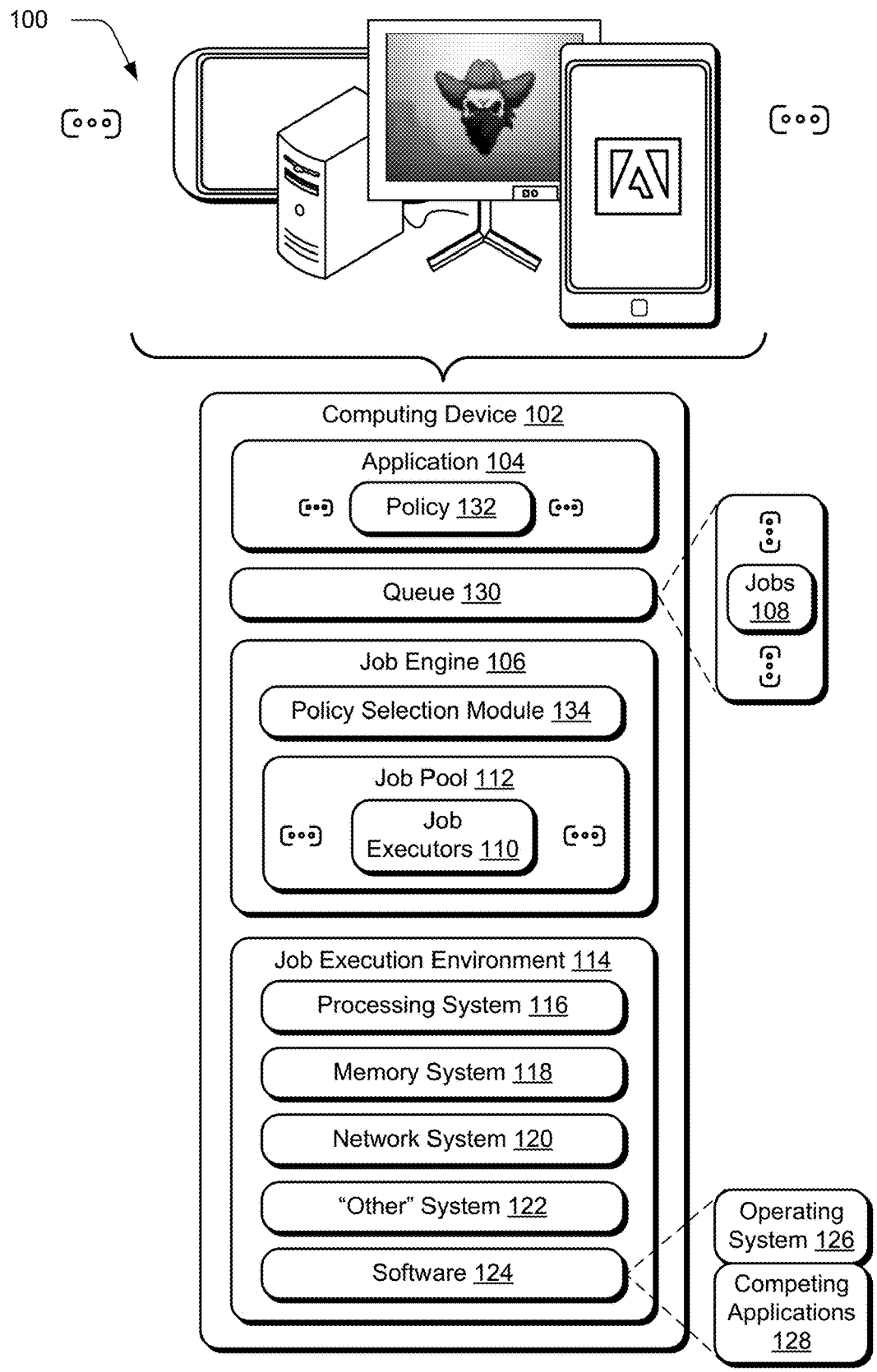
FIG. 1 is an illustration of a digital medium environment in an example implementation that is operable to employ job execution environment control techniques.

Parallelism is used to increase computing device functionality. Parallelism in hardware of a computing device is implemented through a job pool that includes a collection of job executors that executes jobs from a queue. An example of the use of job executors as part of a job pool include use of threads in a threadpool to execute jobs by a processing system of a computing device, and more particularly respective cores of a processor of the processing system. Other examples of hardware systems that support parallelism include memory controllers of a memory system involving parallel read/write operations, network devices involving parallel communication of streams of data via a network, rendering techniques, and so on. Each of these examples support parallel operations for job execution by respective hardware components and software used to support interaction with the components, e.g., operating systems, drivers, and so forth.

In order to address and take advantage of parallelism in the operation of the computing device, a policy is manually created by a programmer of an application in conventional techniques to control a lifecycle of job executors that are used to execute jobs as part of a job pool. The policy specifies a number of job executors that are to be created for use by the application. Conventional techniques to do so, however, rely on a "best guess" based on intuition and experience of the programmer. Complexity of the job execution environment, however, makes accuracy of such a best guess difficult if not impossible to achieve due to an inability to determine an effect of interactions between underlying functionality of the computing device used to execute the jobs. This is due to potential interdependencies of the jobs that are to be executed for the application, differences in hardware resources available from different computing device, as well as the execution of other "competing" applications by the computing device that affect availability of hardware resources in the job execution environment.

As a result, conventional techniques could hinder operation of a computing device, as the complexity of optimizing performance of the hardware components is dependent on a variety of factors that are not detectable by a human being. For example, an amount of I/O operations may increase latency as a number of active job executors increases, whereas in instances in which the jobs do not share a significant amount of resources increases in the number of job executors serves to decrease latency. In a threadpool example, creation of too many threads wastes resources of the processing system and costs time creating unused threads. Likewise, terminating too many threads requires additional time later on when creating the threads again, creating threads too slowly results in increases in wait times, terminating threads too slowly may starve execution of other jobs both by the application as well as other applications, and specifying too many threads may serve to slow job execution in instances involving use of shared resources, even for a single application.

Accordingly, job execution environment control techniques are described to manage policy selection and implementation to control use of job executors by a computing device, automatically and without user intervention. These techniques are usable to select a policy from a plurality of policies that is then used to control lifecycles of job executors of a job execution environment of a computing device. Further, these techniques are usable to respond dynamically to change the selected policy during runtime of the application in response to changes in the job execution environment. This is not possible using conventional techniques nor is this possible to be performed manually by a human being.

In one example, a job engine employs a multi-arm bandit technique to choose the policy from the plurality of policies to control lifecycles of job executors that are used to execute respective jobs, e.g., as part of execution of an application. This technique is configured to address allocation of a fixed limited set of resources (e.g., job executors of a job pool) through use of policy selection in a way to minimize regret and maximize a reward.

In this technique, the job engine is modeled as a gambler to determine which slot machine in a collection of slot machines to play, how many times to play each slot machine, in which order to play the slot machines, and whether to continue with a current machine (exploitation) or to try a different machine (exploration). Each machine provides a random reward (and thereby minimizes regret) based on a probability distribution specific to that machine. Thus, the objective of the job engine as the gambler is to maximize a sum of rewards earned through a series of policy selections over a series of time steps by identifying which machines (i.e., policies) minimize regret, e.g., latency.

To do so, the job engine accesses a plurality of jobs maintained in a storage device that are received through execution of an application by the computing device. Each of the policies defines respective criteria to be used by the job engine to control lifecycles of job executors, e.g., creation and termination of the job executors to execute respective jobs.

The job engine then determines which of the policies minimizes regret (e.g., latency) and therefore maximizes a "reward" using a multi-arm bandit technique. To begin, a policy is selected for use by the job engine to control lifecycles of job executors of a job pool. The job executors are used to execute jobs from a queue of jobs generated by the application. This includes parallel execution and is asynchronous in instances in which a resource is not shared by the jobs.

Performance data is generated that describes the execution of the jobs by the job pool. The performance data, for instance, is configurable as a tuple that describes an average runtime of individual jobs (also referred to as "tasks" in the following discussion), average runtime of overall jobs, a number of active job executors, a number of job executors included in the job pool, and/or a reward mean which is a criterion that is user selectable. The performance data is then passed as an input from the job pool of the job engine to a regret determination module.

The regret determination module receives the performance data, and from this generates regret data indicative of latency and more particularly a latency state of the job pool based on use of the selected policy. The regret determination module, for instance, is configured as a neural network that is "fit" to the performance data through machine learning, e.g., by use of an LSTM decoder, an LSTM encoder, and two fully connected units.

The regret data is then used by a policy selection module to select a policy from the plurality of policies based on the regret data over a series of time steps, i.e., iterations. In one example, the policy selection module uses multi-arm bandit techniques and begins by generating a statistical model that includes reward distributions for each of the plurality of policies based on the regret data. The statistical model is then employed by the policy selection module to select policies to maximize an overall reward over a series of time steps "T" and therefore minimize regret, i.e., latency.

As part of this, the policy selection module utilizes a bandit module that employs exploration techniques in which selections are generated to gather data regarding the reward distributions for respective policies. The bandit module also employs exploitation techniques to maximize a reward at a respective time step for a policy. In this way, the bandit module may "learn" about the reward distributions of respective policies through exploration and maximize the amount of rewards collected at the individual time steps through exploitation.

Both of these techniques are thus employed to maximize an overall amount of reward over the series of time steps through learning about the rewards and collecting the rewards based on this learned knowledge as described by respective reward distributions. As a result, these considerations converge over time to select of a policy that minimizes latency and thus optimizes performance of the computing device. In an implementation, the explore consideration is kept alive through use of a minimum probability in order to dynamically adjust to changes in a job execution environment during runtime of the application, e.g., so the selection does not fixate to a single operation. In this way, the multi-arm bandit techniques may be leveraged for policy selection to dynamically respond to changes in the job execution environment in real time, automatically and without user intervention. Further discussion of these and other examples is included in the following discussion and shown using corresponding figure.

In the following discussion, an example environment is described that employs the techniques described herein. Example procedures are also described that are performable in the example environment as well as other environments.

Consequently, performance of the example procedures is not limited to the example environment and the example environment is not limited to performance of the example procedures.

Example Environment

FIG. 1 is an illustration of a digital medium environment 100 in an example implementation that is operable to employ job execution environment control techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including an application 104 and a job engine 106. The application 104 originates jobs 108 for execution by job executors 110 of a job pool 112 of the job engine 106. The jobs 108 refer to one or more operations or tasks that are executable by respective job executors 110 included within a job pool 112 of the job execution environment 108. The jobs 108, for instance, refer to instructions that are understandable by underlying hardware components of the computing device 102 to implement corresponding functionality.

A variety of hardware components are usable in conjunction with execution of the jobs 108 as part of a job execution environment 114. For example, a processing system 116 is configurable to execute the jobs 108 using the job executors 110 as implemented as threads. Thus, in this example the jobs 108 are configured as assembly language that is understandable by an underlying processor of the processing system 116. Other examples include operations performable by a memory system 118, network system 120, and "other" systems 122, e.g., printers, display devices, and so on. The job execution environment 114 also includes software 124 that supports interaction with these hardware components, e.g., an operating system 126, other "competing" applications 128 that are executed by the computing device 102, drivers, and so forth. Thus, the job pool 112 supports parallel execution of the jobs 108, asynchronous execution, use of shared resources, and so on.

For example, execution of the application 104 causes jobs 108 to be inserted into a queue 130, which are then executed by job executors 110 of the job pool 112. Policies 132 are employed to manage a life cycle of the job executors 110, e.g., how many job executors 110 are to be utilized to execute jobs 108 of the application 104, when to create or terminate the job executors 110, and so on. In the illustrated instance, the job engine 106 includes a policy selection module 134 to select and optimize policies that are used to manage the job pool 112 and job executors 110 within the pool.

Figure 2:
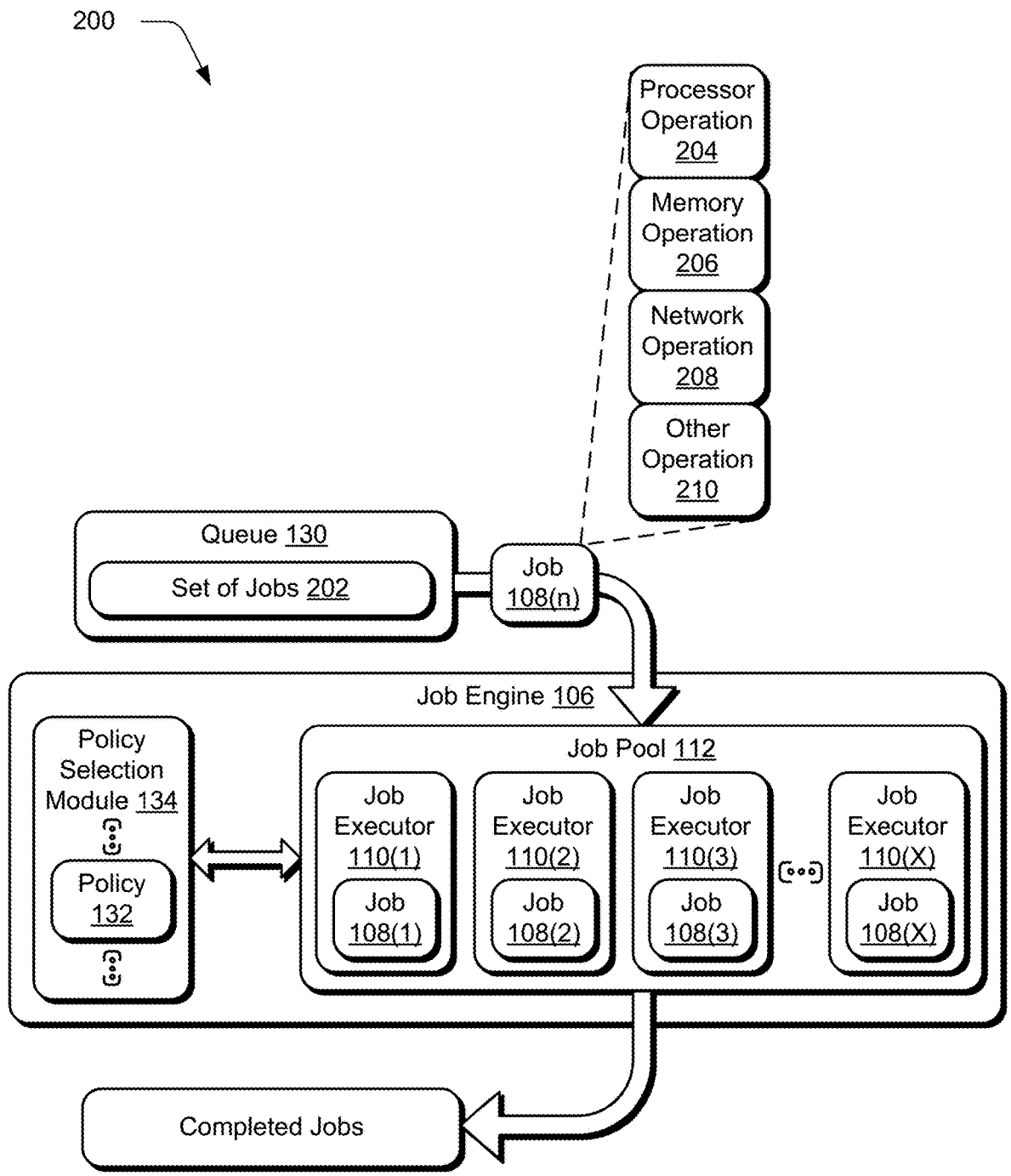
FIG. 2 depicts a system showing an example of operation of a job engine of FIG. 1 in greater detail.

FIG. 2 depicts an example system 200 showing operation of the job engine 106 in greater detail. The queue 130 includes a set of jobs 202 received from the application 104. A job 108(n) is indicated as being passed from the queue 130 to a job pool 112 of the job engine 106. The job 108(n) is representative of an operation that is executable at least in part using hardware components of the computing device, examples of which include a processor operation 204, memory operation 206, network operation 208, or other operation 210.

The job pool 112 includes a number of job executors 110(1), 110(2), 110(3), . . . , 110(X) to execute jobs 108(1), 108(2), 108(3), . . . , 108(X) from the queue 130 as specified by the policy 132 for the application 104. The policy selection module 134 is configured to dynamically choose which policy 132 to implement from among the plurality of policies to manage operation of the job pool 112, and therefore how to execute jobs 108 in parallel using the job pool 112, e.g., for a given application 104. The policy selection module 134, for instance, selects the policy 132 that minimizes regret and therefore exhibits a least amount of latency in job execution, thereby improving operation of the computing device 102. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Multi-Arm Bandit Based Policy Selection Techniques

Figure 3:
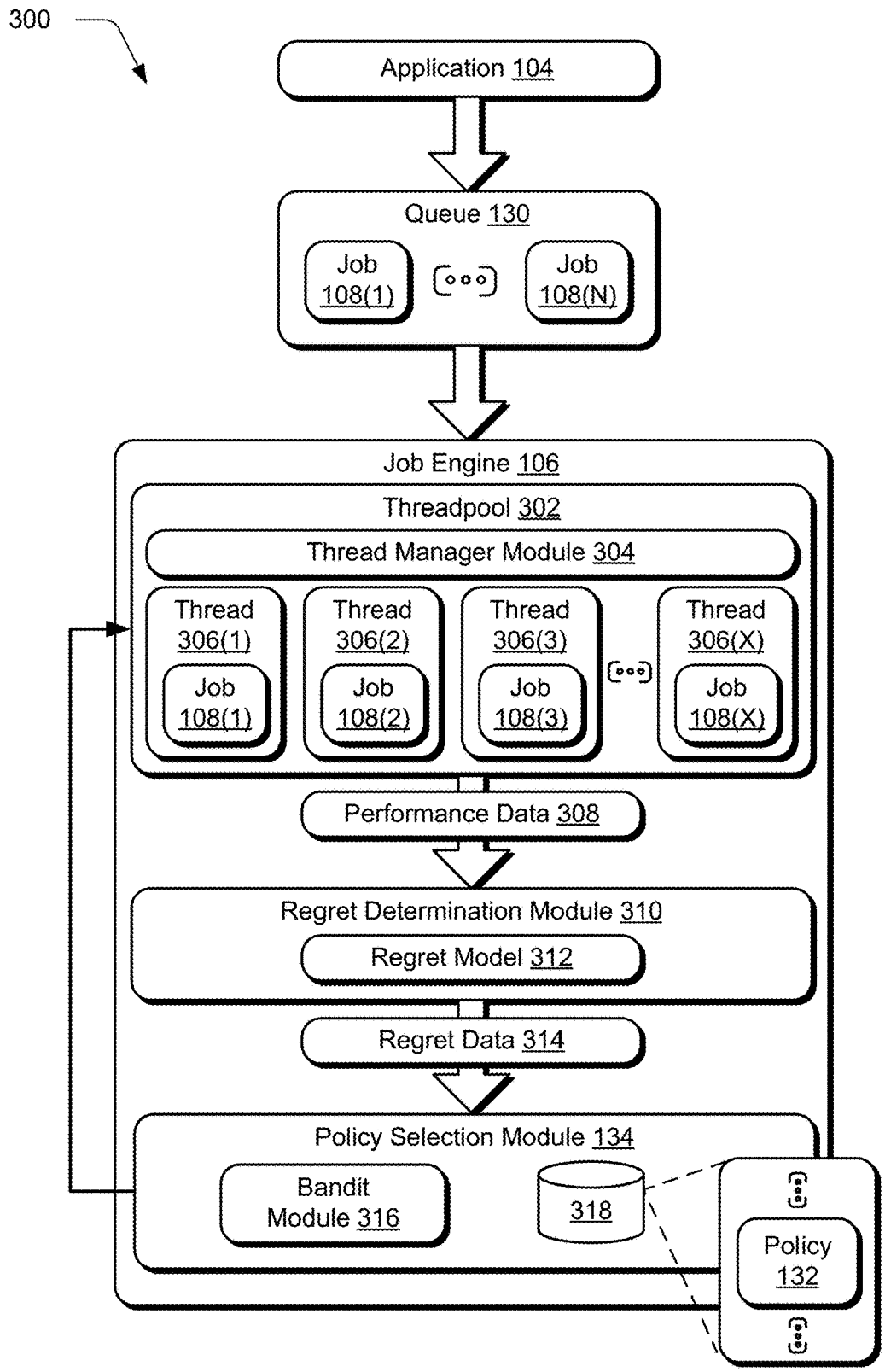
FIG. 3 depicts a system in an example implementation showing operation of the job engine of FIG. 1 as implementing policy selection for a threadpool.
Figure 4:
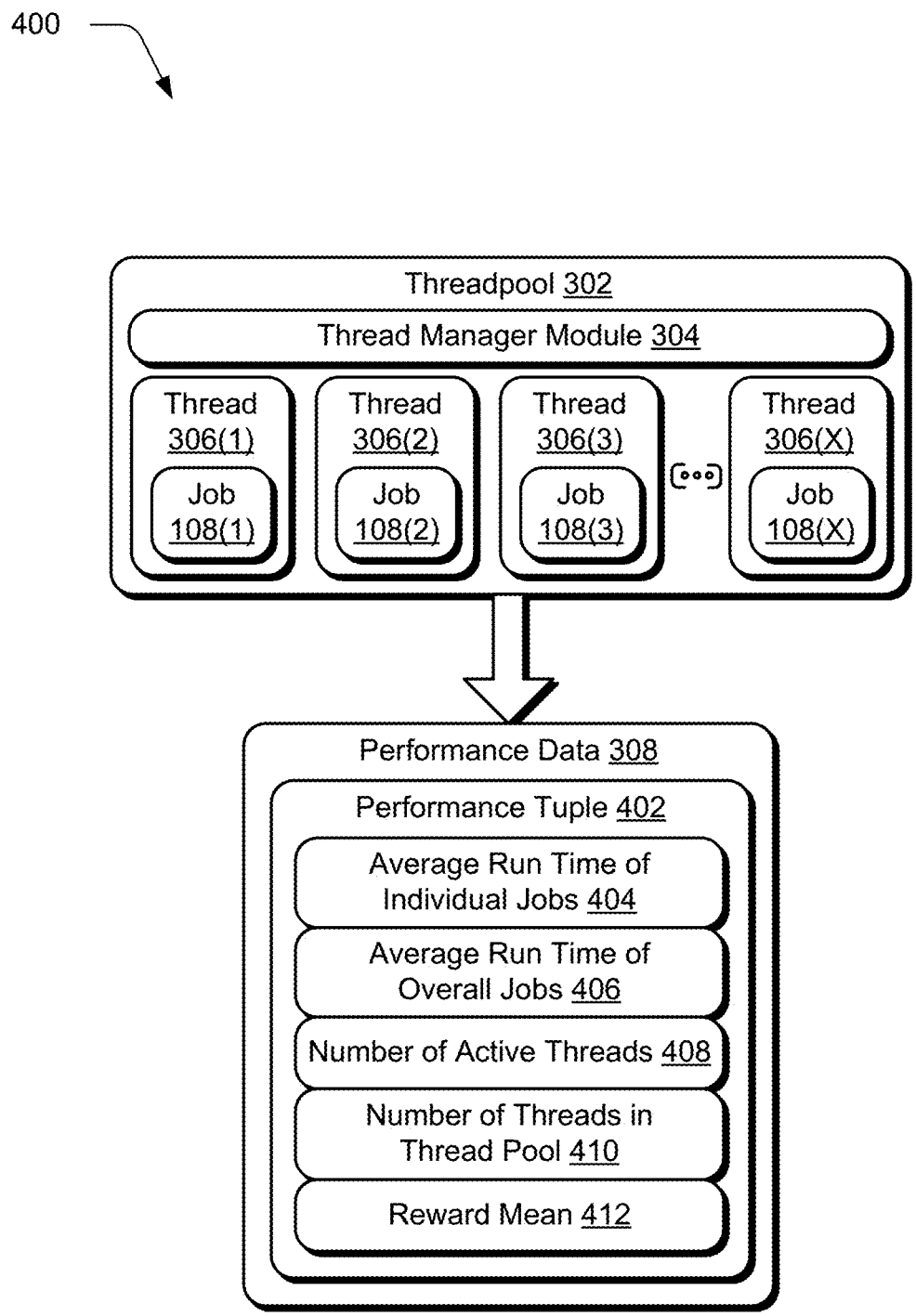
FIG. 4 depicts a system in an example implementation showing operation of a threadpool of FIG. 3 in greater detail as generating performance data.
Figure 5:
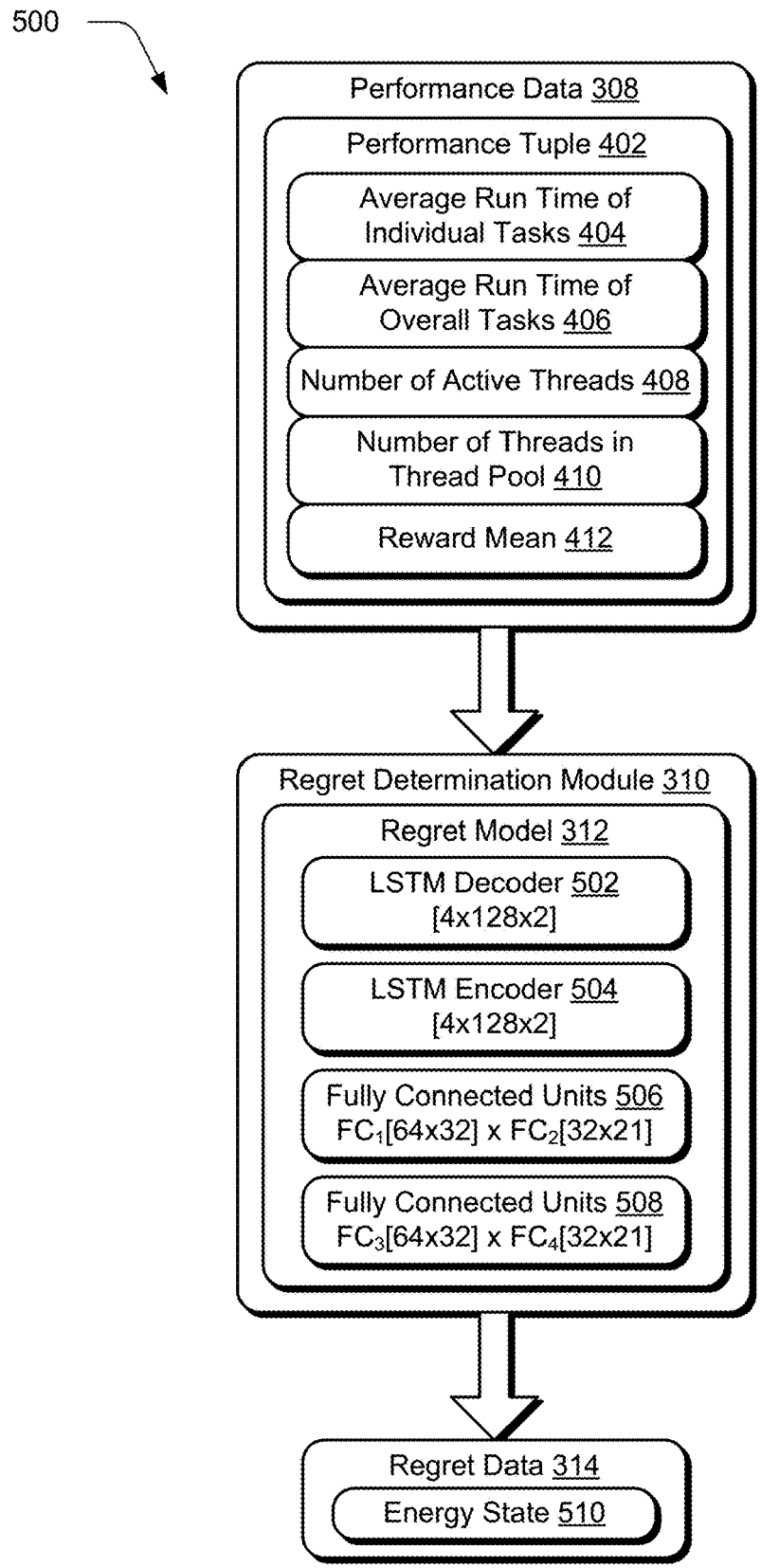
FIG. 5 depicts a system in an example implementation showing operation of a regret determination module of FIG. 3 in greater detail as generating regret data indicative of latency in operation of the threadpool to execute jobs from a queue.
Figure 6:
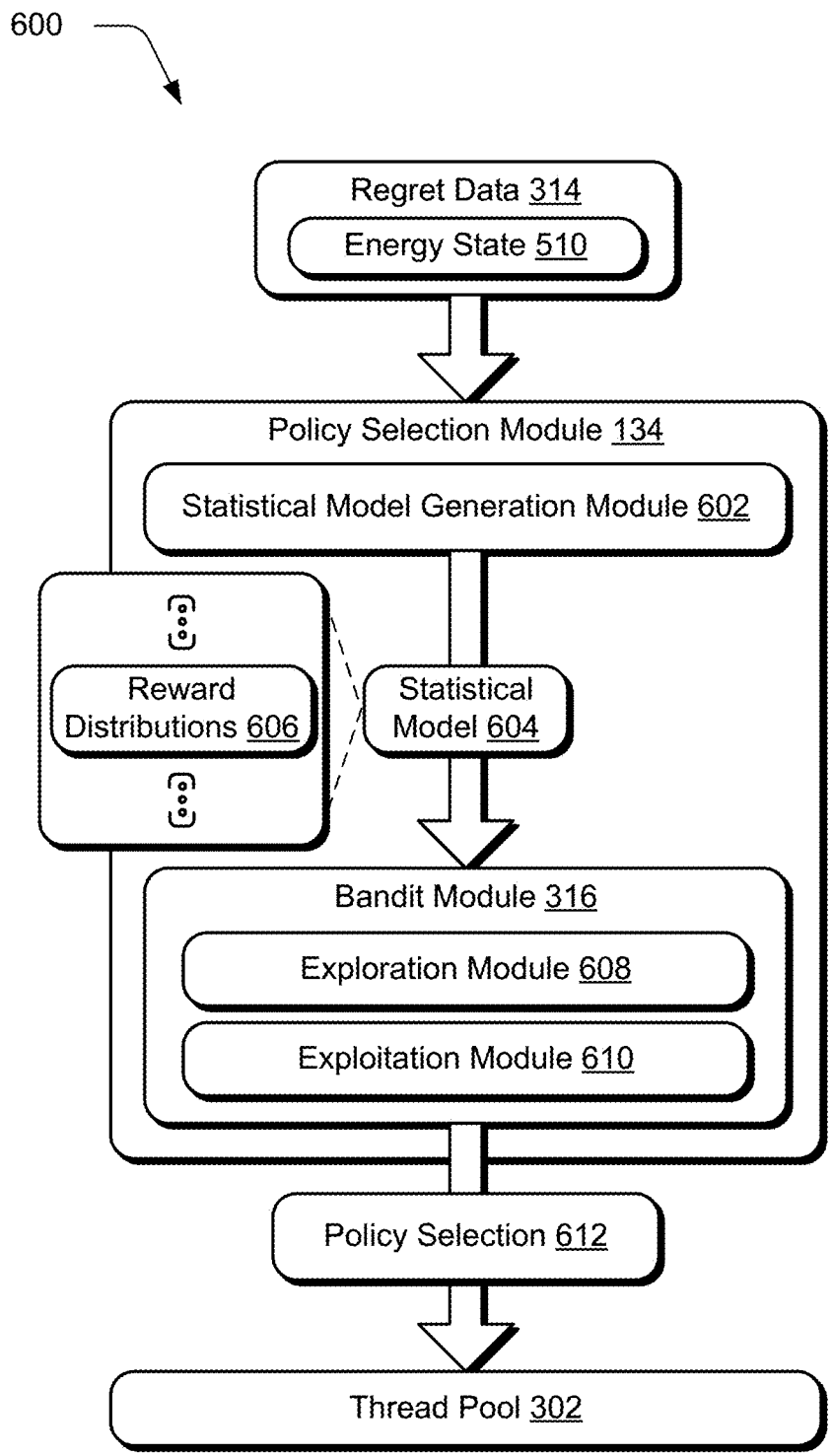
FIG. 6 depicts a system in an example implementation showing operation of a policy selection module of FIG. 3 in greater detail as selecting a policy using a multi-arm bandit technique.
Figure 7:
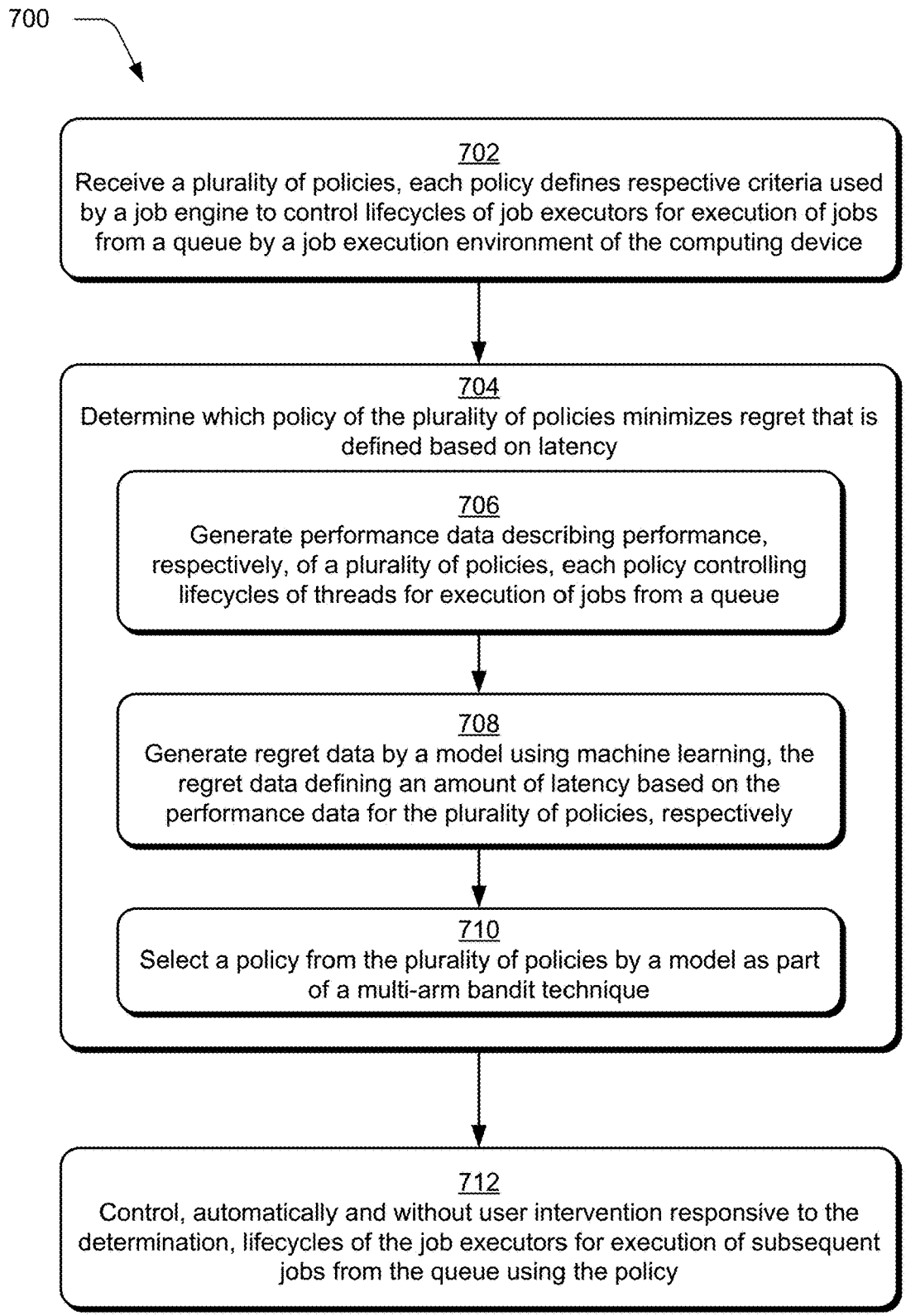
FIG. 7 is a flow diagram depicting a procedure in an example implementation in which a policy is selected for managing lifecycles of job executors of a job pool using a multi-arm bandit technique.

FIG. 3 depicts a system 300 in an example implementation showing operation of the job engine 106 of FIG. 1 as implementing a threadpool for policy selection. FIG. 4 depicts a system 400 in an example implementation showing operation of a threadpool of FIG. 3 in greater detail as generating performance data. FIG. 5 depicts a system 500 in an example implementation showing operation of a regret determination module of FIG. 3 in greater detail as generating regret data indicative of latency in operation of the threadpool to execute jobs from a queue. FIG. 6 depicts a system 600 in an example implementation showing operation of a policy selection module of FIG. 3 in greater detail as selecting a policy using a multi-arm bandit technique. FIG. 7 depicts an example procedure 700 in which a policy is selected for managing lifecycles of job executors of a job pool using a multi-arm bandit technique.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

FIG. 3 depicts the job engine 106 as implemented in a threadpool 302 scenario in which a thread manager module 304 manages the job executors 110 as threads implemented by cores of a processing system 116. Although configuration of the job executors 110 as threads 306(1)-306(X) and the job pool 112 as a threadpool 302 is described, this example is equally applicable to the other job execution scenarios as described in relation to FIGS. 1 and 2.

This example begins by receipt of a plurality of policies 132 by a job engine 106. Each of the policies 132 defines respective criteria used by the job engine 106 to control lifecycles of job executors for execution of jobs from a queue 130 by a job execution environment of a computing device (block 702). In one example, the plurality of policies 132 are included as part of the application 104 and therefore are received by the job engine 106 from the application 104 and stored in a storage device 318. In another example, a repository includes a plurality of preconfigured policies 132 that are maintained separately from the application 104 in the storage device 318. A variety of other examples are also contemplated.

The policies 132 describe criteria used to control lifecycles of the job executors 110, e.g., the threads 306(1)-306(X) in this instance. The criteria may vary in complexity, such as to employ fixed numbers of job executors 110, conditions to create and/or terminate the job executors 110, e.g., based on resource utilization, types of jobs 108 for execution, portions of application 104 being executed, availability of computational resources of the computing device 102, and so forth. For example, the policies may describe a minimum number of job executors 110 that are available, a maximum number of job executors 110 to be made available in the job pool 112 to the application 104, a death rate (e.g., after completion of execution of a job 108, the job executors 110 are terminated accordingly to a Bernoulli Distribution), a birth rate (e.g., the job executors 110 are created accordingly to a Bernoulli Distribution), and so forth.

In FIG. 3, the job engine 106 utilizes multi-arm bandit techniques to choose between different policies 132 to manage lifecycles of threads 306(1), 306(2), 306(3), ..., 306(X) in a threadpool 302 for execution of respective jobs 108(1), 108(2), 108(3), ..., 108(X) from the queue 130. As previously described, a job 108 "($J$)" is a sequence of instructions "$(l_i)_{i \in \mathbb{N}}$" that are understood by underlying hardware components of the computing device 102, e.g., as assembly language of an underlying processor.

Each of these instructions "$(I_i)$" takes time "$T_i$" to execute. In some instances "$T_i$" is fixed, for example, when pure arithmetic operations are involved. In other instances "$T_i$" is not fixed, particularly when involving I/O instructions. In multi-tasking systems, there are typically instructions "$I_k$" and "$I_{k+1}$" between which there are additional instructions from other jobs or applications that are being scheduled. This gap, denoted as "$G_k$" between "$I_k$" and "$I_{k+1}$," induces stochastic behavior in the application 104 and is a dominant feature of a multi-tasking system. When several jobs are executed (and corresponding instructions/operations of those jobs), then "$G_k$" for a given job 108 has a higher degree of stochasticity, i.e., randomness. An increase in the size of gaps decreases the performance in executing a job 108, i.e., increases latency. Therefore, gaps and effective parallelism of jobs 108 are two opposing forces that determine overall latency for execution of a given set of jobs 108.

The job engine 106 in this example employs an energy-based model for latencies in job execution as part of the multi-armed bandit technique. The job engine 106 is tasked with making one of three decisions:

(1) (∥) keep the policy the same;
(2) (⇑) look for a policy to increase a number of threads; or
(3) (⇓) look for a policy to decrease a number of threads. The last two decisions are made with a goal of pulling down the overall "energy configuration" which is mapped to latencies in job execution by the computing device 102. In the following, the job engine 106 utilizes multi-arm bandit techniques to determine which policy minimizes regret defined as latency without requiring knowledge of underlying hardware and software functionality of the job execution environment 114 and even without having insight into operation of the individual policies 132.

A determination is made by the job engine 106 as to which policy of the plurality of policies 132 minimizes regret that is defined based on latency (block 704). To do so, the job engine 106 selects policies 132 through use of the policy selection module 134. These policies 132 are then used by a thread manager module 304 to control a lifecycle of threads 306(1)-306(X) in the threadpool 302. Control of the lifecycle of the threads 306(1)-306(X) includes following criteria of the policy 132 by the thread manager module 304 to create and terminate threads 306(1)-306(X) for execution of jobs 108(1)-108(X).

FIG. 4 depicts a system 400 in an example implementation showing operation of a threadpool 302 of FIG. 3 in greater detail as generating performance data 308 that describes performance, respectively of the plurality of policies (block 706). The threadpool 302 manages lifecycles of threads 306(1)-306(X) to execute respective jobs 108(1)-108(X). The threads 306(1)-306(X) may run in parallel, provided that the underlying processing system 116 of the computing device 102 is multicore. Jobs 108(1)-108(X) are executable asynchronously when not accessing a shared resource. A threadpool ($\mathfrak{x}$) can be represented as a tuple:

$$\mathfrak{x} := (\mathbb{T}, \mathbb{Q}, \mathcal{P}, \mathcal{T}, \mathcal{J})$$

where:
$\mathbb{T}$ := set of threads associated with the threadpool ($\mathfrak{x}$);
$\mathbb{Q}$ := queue of jobs currently pooled for execution by the threadpool;
$\mathcal{P}$ := policy to create or destroy threads, and pick jobs from the queue ($\mathbb{Q}$);
$\mathcal{T} := \mathcal{T} \subseteq \mathbb{T}$ is the subset of threads that have picked job from the threadpool; and
$\mathcal{J}$ := set of jobs currently picked up by the threads.

A thread is denoted by "$t_i$" or "$t_\alpha$" where "i" or "α" belong to a suitable indexing set. A job is denoted by "$j_r$" or "$j_\gamma$" where "r" or "γ" belong to a suitable indexing set. "$\mathcal{J} \cup \mathbb{Q}$" is set of all jobs associated with the threadpool 302. Thus, "$j_* \in \mathcal{J} \cup \mathbb{Q}$" and "$t_* \in \mathcal{T} \subseteq \mathbb{T}$."

Let "$n \in \mathbb{N}$" be a horizon, where "n" denotes a time value "$t_n$" of a respective timestep or a "tick-n" depending on context. Instantiations/implementations of the threadpool 302 for respective policies 132 are denoted by "$\mathfrak{x}_n$," where "$\mathfrak{x}_n := (\mathbb{T}_n, \mathbb{Q}_n, \mathcal{P}_n, \mathcal{T}_n, \mathcal{J}_n)$" and "$(*_n)$" corresponds to the values of "$(*)$" at the instant "n." In the following, "$\mathcal{P}_n = \mathcal{P}$" is considered a constant, that is a policy 132 for a given threadpool 302 is a constant. Thus, a threadpool implementing a corresponding policy in denoted as "$\mathfrak{x}^k$" where "$\mathcal{P}^k$" is the associated policy. "$\mathfrak{x}_n^k$" is an instantiation of "$\mathfrak{x}^k$" at the horizon "n."

Thus, the job engine 106 in this example is configured to make a choice from a set "$\mathbb{T} := [\mathfrak{x}^k]$" of policies 132 implemented by the threadpool 302 where each policy 132 can be denoted as an arm or machine in a multi-arm bandit technique. Threadpool 302, as part of implementation of the policies 132, interacts within a job execution environment 114 "ε" that includes hardware components (e.g., processing system 116, memory system 118, network system 120, and other systems 122) as well as software 124 that is used to interact with the hardware components (e.g., an operating system 126), competing applications 128, and other hardware/software resources.

In order to make the determination as to which policy of the plurality of policies 132 are to be employed to manage the threadpool 302, an energy-based model is employed in which the higher the energy of the system, the higher the latencies. Interactions increase system energy, while true parallelism involves a decrease (dissipation) of energy. Increases in the speed of execution (i.e., a reduction in latency) thus involves a decrease in the overall energy of the system. Thus, the energy-based model is denoted as follows:

$$P_{(r,\gamma|\mathcal{I})} = P_{(r,(\mathcal{P},\mathcal{J},\mathcal{T})|\mathcal{I})} = \mathcal{N}_{(r|\mu(\mathcal{P},\mathcal{J},\mathcal{T}),\sigma)},$$

where "N" is gaussian, and "$\sigma=1$. $\mu(\mathcal{P},\mathcal{J},\mathcal{T})$" is analogous to Fermi-Dirac statistics, where:

$$1/\mu(\mathcal{P},\mathcal{J},\mathcal{T}) = \frac{g(|\mathcal{T}|,\mathcal{J},\mathcal{P})}{1+e^{-\alpha(|\mathcal{T}|-n_o)}}$$

"$1/\mu(\mathcal{P},\mathcal{J},\mathcal{T})$" is included on the left-side of the equation because the right-hand side represents a model for latency. The value "$\alpha$" is a factor representing job interactions, "$|\mathcal{T}|$" denotes a number of threads, "$n_o$" is the higher value of a number of threads; and values of "$|\mathcal{T}|$" greater than "$n_o$" increases latency. The inverse of "$g(|\mathcal{T}|,\mathcal{J},\mathcal{P})$" denotes a degree of parallelism of jobs 108 from the application 104. Thus, for faster execution, "$g(|\mathcal{T}|,\mathcal{J},\mathcal{P})$" is smaller. The term "$1/(1+e^{-\alpha(|\mathcal{T}|-n_o)})$" is analogous to sigmoid. Thus, "$1/\mu(\mathcal{P},\mathcal{J},\mathcal{T})=g(|\mathcal{T}|,\mathcal{J},\mathcal{P})\times sigmoid(w_o+w_1|\mathcal{T}|)$." The values "$g(\cdot)$" and "$\alpha$" are modeled as an output of a neural model, and enumerated from the neural model:

$$\mu(\mathcal{P},\mathcal{J},\mathcal{T}) = \left(\frac{1}{g(|\mathcal{T}|,\mathcal{J},\mathcal{P})}\right)\frac{1}{sigmoid(-w|\mathcal{T}|)}.$$

Returning again to FIG. 4, upon completion of the jobs 108(1)-108(N) by the threadpool 302, performance data 308 is generated describing characteristics of this execution. In an example, this is expressed as a performance tuple 402 that contains one or more of the following values:

i. average run time of individual jobs 404 ($\overline{R_{\mathcal{J}}}$)—if "$\mathcal{J}$" is set of jobs executed by the threadpool 302 then, $$\overline{R_{\mathcal{J}}} = \frac{1}{|\mathcal{J}|}\sum_{j\in\mathcal{J}}t_j,$$

where "$t_j$" is an amount of time taken to execute the "jth" job.

ii. average run time of overall jobs 406 ($\overline{R}$)—if "$\mathcal{J}$" is set of jobs executed by the threadpool 302 then, $$\overline{R} = \frac{T_{\mathcal{J}}}{|\mathcal{J}|},$$

where "$T_{\mathcal{J}}$" is an amount of time taken to execute the set "$\mathcal{J}$." With parallelism, "$\overline{R} < \overline{R_{\mathcal{J}}}$" is expected and "$\overline{R}^k$" of threadpool executing policy "$x^k$" is less than "$\overline{R}^l$" of threadpool executing policy "$x^l$" if the number of threads "$|\mathcal{T}^k|$" is greater than "$\mathcal{T}^l$." Though with parallelism this expectation may or may not hold due to interactions, although in practice it has been observed that "$\overline{R_{\mathcal{J}}^k} < R_{\mathcal{J}}^l$" if "$|\mathcal{T}^k| > |\mathcal{T}^l|$." Thus, parallelism negatively affects performance in execution of individual jobs 108 in most instances.

iii. number of active threads 408 ($|\mathcal{T}|$);
iv. number of threads in Threadpool 410 ($|\mathbb{T}|$); and
v. reward_mean 412 ($\mu$) specific to the criterion that is manually set by a user.

Thus, the performance data 208 is expressed as a sequence of tuples: ($\overline{R_{\mathcal{J}}}$, $\overline{R}$, $|\mathcal{T}|$, $|\mathbb{T}|$, $\mu$).

Returning again to FIG. 3, the performance data 308 is passed from the threadpool 302 as an input to a regret determination module 310. The regret determination module 310 employs a regret model 312 to generate regret data 314 using machine learning. The regret data 314 defines an amount of latency based on the performance data 308 for the plurality of policies, respectively (block 708). Regret, also referred to as opportunity loss, defines a difference between an actual payoff and a payoff that would have been obtained if a different course of action had been chosen. In this example, regret is defined with respect to latency, and therefore minimizing regret is used to decrease latency in operation of the computing device 102.

FIG. 5 depicts an example system 500 showing operation of the regret determination module 310 of FIG. 3 in greater detail. The regret determination module 310 receives as an input the performance data 308 and, using a regret model 312, generated regret data 314 describing an energy state 510 in accordance with the energy model described above. The regret model 312, also referred to as a generalized threadpool regret model (GTRM) in the following is a neural model, fit on "($\overline{R_{\mathcal{J}}}$, $\overline{R}$, $|\mathcal{T}|$, $|\mathbb{T}|$, $\mu$)" where "$\mu$" is the dependent variable. The regret model includes an LSTM decoder 502, LSTM encoder 504, and two fully connected units 506 508 forming the following cascade:

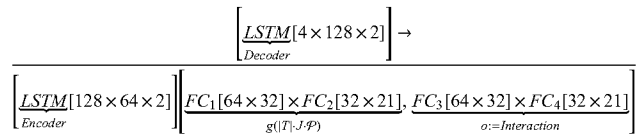

The LSTM pairs form a decoder-encoder model, where the output of the LSTM decoder 502 represents the energy state of the system. The output of fully connected units 506, 508 corresponds to each of the threadpool-implemented policies.

Various notions of latency are associated with job execution. One definition of latency is associated with the average run time of jobs. The other is associated with a given application 104. A third notion is a composition of these last two latencies. If "$l^*$" is the maximum speed (inverse of least latency) for the most efficient policy-implemented threadpool in "$\mathbb{T} := [x^k]$," and "$l^k$" is the speed (inverse of latency)

associated with threadpool arm "k," then regret is defined as "$r^k:=l^*-l^k$." Along a horizon, regret is denoted as "$r_n^k$." The goal is to minimize $$"E\left[\sum_{j=1}^{n} r^{i,j}\right] = E\left[\sum_{j=1}^{n} l^*\right] - E\left[\sum_{j=1}^{n} l^{i,j}\right]"$$

where $$ij \in [k]$$

is an arm instance.

When a threadpool instance "$\mathfrak{T}$" is executing, its impact on operation of the computing device 102 is because of the policy "$\mathcal{P}$" associated with it, the nature of jobs "$\mathcal{J}$" running in parallel, and thirdly through a number of threads that are being executed "$\mathcal{T}$." This impact is denoted as the tuple "$\gamma:=(\mathcal{P},\mathcal{J},\mathcal{T})$" along the horizon denoted as "$\gamma_n^k$." As an example, if "$\mathcal{J}$" includes jobs 108 that consume a significant amount of memory, then a bigger set "$\mathcal{T}$" (that is "$|\mathcal{T}|$," number of active threads is large) leads to higher latencies. A policy "$\mathcal{P}$," which increases "$|\mathcal{J}|$" and "$|\mathcal{T}|$" (by invoking an additional number of threads and executing an additional number of jobs) decreases efficiency, and hence is not favorable. System memory, hardware resources, and competing programs are latent variables that are typically not measurable by a human being or otherwise due to lack of insight into operational interactions and nature of impact of those interactions on performance.

Accordingly, the tuple "$\gamma$" and current system state "$\mathcal{I}$" affects a latent regret (vector) variable "$z$" which is the parent of regret "r." Further, the system state "$\mathcal{I}$" is a component that represents an external environment in which the application 104 is executed and is not under the direct control of the application 104. This results in the following graphical model: "$\gamma \rightarrow z \rightarrow r$" which a corresponding estimate as follows:

$$P(r|Y, \mathcal{I}) =$$

$$\frac{\int P(r, z, Y|\mathcal{I})dz}{P(Y|\mathcal{I})} = \frac{\int P(r|z, Y, \mathcal{I})P(z, Y|\mathcal{I})dz}{P(Y|\mathcal{I})} = \int P(r|z, \mathcal{I})P(z|Y, \mathcal{I})dz$$

The values:

$$P(r| z, \gamma, \mathcal{I}) = P(r| z, \mathcal{I})$$

are set as such because "$z$" is a direct parent of "r." Thus, given a job execution environment "$\mathcal{I}$," the impact tuple "$\gamma$" indexes into those "$z$" for which the value of "$P(r| z, \mathcal{I})$" is higher for lower regret.

The regret data is then passed from the regret determination module 310 to a policy selection module 134. A bandit module 316 is then employed by the policy selection module 134 to select a policy 132 from the plurality of policies 132 by a model as part of a multi-arm bandit technique (block 710). Functionality of the policy selection module 134 is illustrated as being implemented by a statistical model generation module 602 and a bandit module 316 in the example system 600 of FIG. 6.

To begin, regret data 314 is received by the policy selection module 134. A statistical model generation module 602 is then employed to form a statistical model 604 based on the regret data 314. The statistical model 604 describes a plurality of reward distributions 606 for a plurality of policies, respectively. The statistical model 604 may be generated in a variety of ways, such as through use of regression analysis techniques including linear regression. In this way, the statistical model 604 includes a reward distribution 606 for each of the policies 132, which may be further refined (i.e., learned) through exploration or leveraged through exploitation.

The statistical model 604 is then employed by a bandit module 316 to generate a policy selection 612. As part of this, the bandit module 316 is configured to address a tradeoff between exploration as implemented by an exploration module 608 and exploitation as implemented by an exploitation module 610. In exploration, the policy selection 612 is generated to improve knowledge about a relationship (e.g., linear relationship) between the feature vector and the reward, e.g., to further refine the statistical model 604 as increasing knowledge of the reward through use of the regret data 314. Thus, exploration is implemented by the exploration module 608 to increase an amount of data gathered for each of the plurality of policies as serving as a basis for the policy selection 612. An example of an exploration technique that may be implemented by the exploration module 608 includes a uniform sampling exploration technique.

In exploitation as implemented by the exploitation module 610, the policy selection 612 is generated to maximize effectiveness in minimizing regret (i.e., latency), e.g., based on the reward distribution 606 of the statistical model 604 for respective policies. An example of an exploitation technique includes an upper confidence bound (UCB) technique.

Thus, in exploitation as implemented by the exploitation module 610 a policy selection 612 is generated to maximize a reward at an individual time step. Exploration as implemented by the exploration module 608 is used to increase knowledge and accuracy of the reward distributions 606, e.g., a confidence interval for each distribution. This increased knowledge and accuracy may then be used to further exploit collection of rewards for future time steps and thus maximize the reward for a series of times steps "T."

In this way, the policy selection module 134 is configured to address a tradeoff involves balancing a goal of selecting the policy 132 that is most effective and determining which policy 132 is most effective. Thus, in some instances it may be desirable to generate a policy selection 612 for a sub-optimal policy 132 (i.e., is less effective) to learn more about the linear relationship between the policy and the reward and thus increase a likelihood of accuracy of the policy selection 612.

The bandit module 316 in one example implements the multi-arm bandit technique as an upper confidence bound (UCB) bandit algorithm as described above. For example, the bandit module 316 employs upper confidence bound calculations as follows:

$$UCB_i(t-1, \delta) = \begin{cases} \infty & \text{if } \mathcal{T}_i(t-1) = 0 \\ \hat{\mu}_i(t-1) + \sqrt{\frac{2\ln(1/\delta)}{\mathcal{T}_i(t-1)}} & \text{otherwise.} \end{cases}$$

Here, "i" is "ith" arm, (i.e., policy), "$\delta=1/n^2$," where "n" is the number of iterations algorithm executes at the minimum (one thousand or greater) and the value "$\mathcal{T}(t)$" is the number of times the "ith" arm is executed until time "t."

In an implementation, the explore tendency is kept alive, even when the bandit module 316 exhibits convergence towards a particular arm. This is implemented to allow the application 104 to remain agile to changes to the job execution environment during runtime, which is otherwise not possible if the policy selection module 134 keeps on exploiting a single arm without additional exploration. Exploration is performed with a minimum probability of 0.05. The bandit module 316 then chooses the arm (i.e., policy 132) based on sampling values from the regret data 314. The value "$\mu_i$" thus received is used to sample weights from the gaussian distribution "$w_i \sim \mathcal{N}(\cdot|\mu_i, 1)$." Each of these weights is used as weights for discrete distributions to choose the arms and corresponding policies 132. An example 800 of an implementation of regret and a multi-armed bandit technique together is illustrated in FIG. 8.

The policy 132 referenced by the policy selection 612 is then used to control lifecycles of the job executors 110 for execution of subsequent jobs 108 from the queue 130 (block 712). This may be performed, for instance, to "set" a particular policy 132 for use by the application 104. In another example, these techniques continue over runtime (e.g., at set time periods or constantly) to dynamically adjust to changes in the job execution environment 114. In this way, operational efficiency of the job execution environment 114 and more particularly components of the environment such as a processing system 116, memory system 118, network system 120, other systems 122, and software 124 is improved.

Figure 9:
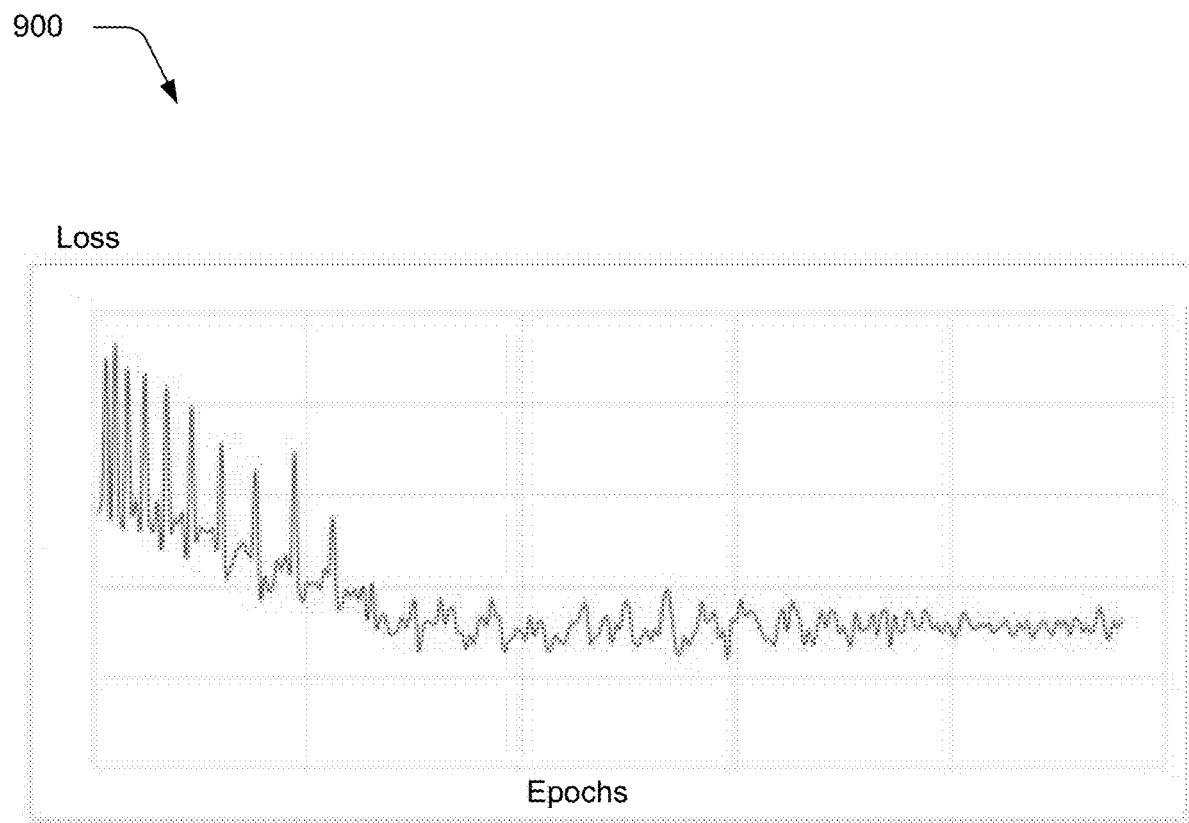
FIG. 9 depicts an example of convergence achieved through use of a multi-arm bandit technique for policy selection.

In a testing implementation, loss is measured with respect to a number of epochs (for the "goodness" of the regret determination) and convergence of the multi-arm bandit technique. Example results 900 are shown in FIG. 9, which illustrates that after 40 epochs convergence is reached. As shown in FIG. 9, when the operation of the job execution environment is stationary, then the latency-net quickly converges. However, when the job execution environment is burdened by other applications or its focus changes, then latency-net starts looking for a newer convergence. This illustrates advantages of continued exploration described above.

Example System and Device

Figure 10:
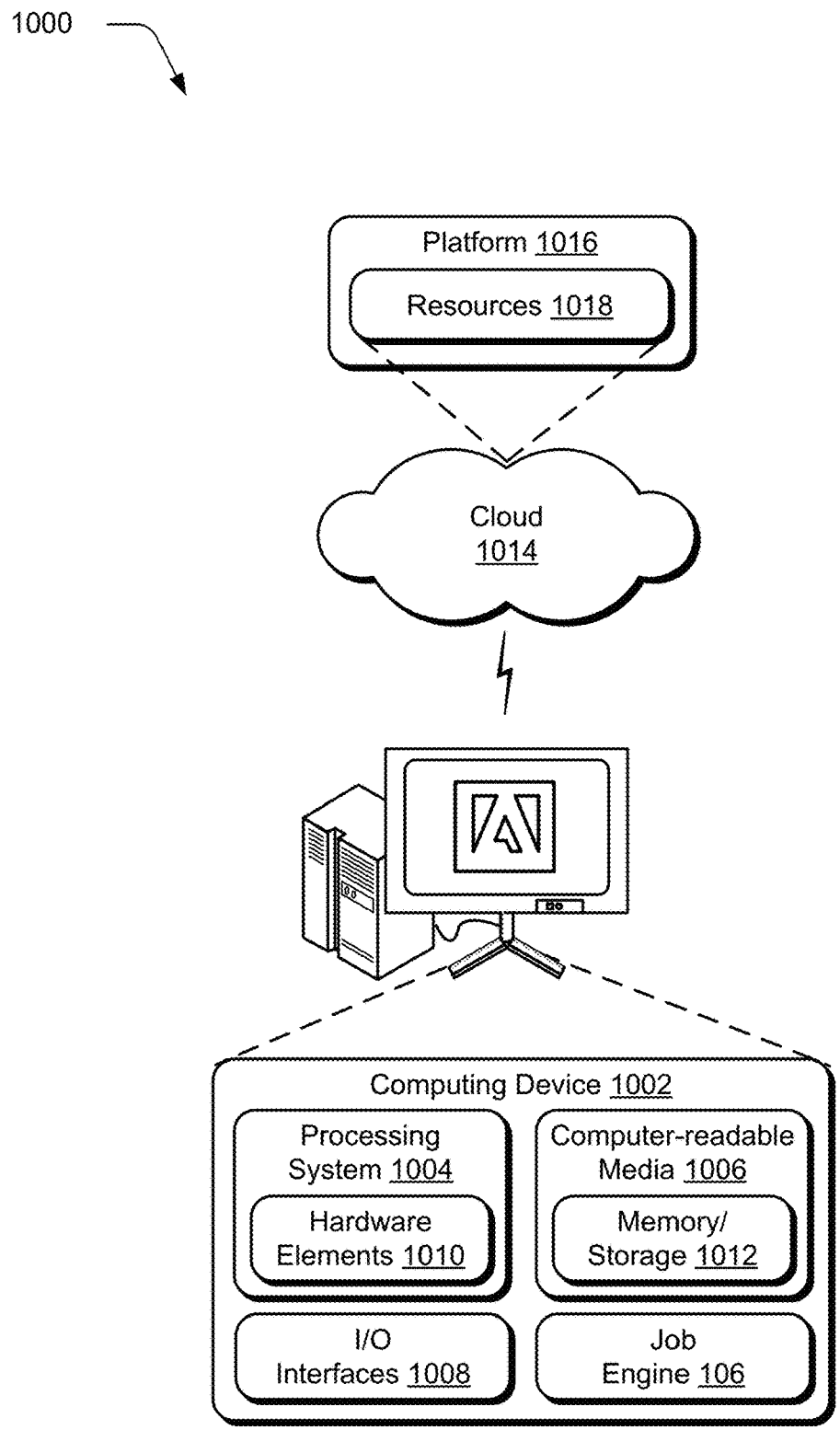
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the job engine 106. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system, comprising:
    a threadpool implemented by a computing device to generate performance data describing performance, respectively, of a plurality of policies, the performance based on one or more characteristics of execution of jobs from a queue resulting from using respective individual policies of the plurality of policies to control lifecycles of threads for the execution of the jobs, each said policy defining respective criteria for controlling the lifecycles of the threads;
    a regret determination module implemented by the computing device as a neural network configured to receive the performance data and to fit to the performance data through machine learning to generate regret data, the regret data defining an amount of latency based on the performance data for the plurality of policies, respectively;
    a policy selection module implemented by the computing device to select a policy from the plurality of policies by a model as part of a multi-arm bandit technique based on the regret data, the selected policy used by the threadpool to control lifecycles of the threads as part of execution of subsequent jobs from the queue to decrease operation latency of the threadpool associated with the execution of the subsequent jobs, the multi-arm bandit technique defined such that each policy of the plurality of policies is modeled as a respective arm of a plurality of arms and the policy selection module uses the multi-arm bandit technique to select the policy by selection of one of the plurality of arms based on exploration and exploitation, and the exploration is performed with a minimum probability even during convergence of the selection toward a particular arm of the plurality of arms; and
    the threadpool further configured to execute the subsequent jobs from the queue while using the selected policy to control the lifecycles of the threads for the execution of the subsequent jobs.

2. The system as described in claim 1, wherein the criteria include conditions to create and terminate the threads as part of operation of a processing system of the computing device.

3. The system as described in claim 1, wherein the characteristics include a number of active threads, a number of threads in the threadpool executed as corresponding to a respective said policy, and an amount of time spent executing the jobs.

4. The system as described in claim 1, wherein the jobs include parallel jobs involving independent operation and shared-resource jobs involving a shared resource by at least two said jobs.

5. The system as described in claim 1, wherein the regret data describes regret that is based on the amount of latency as an amount of time used by a processing system of the computing device for the execution of said jobs.

6. The system as described in claim 1, wherein the amount of latency is defined as an average runtime of individual said jobs.

7. The system as described in claim 1, wherein the amount of latency is defined as an average runtime of an overall collection of said jobs.

8. The system of claim 1, wherein the model is an energy-based model and the regret data describes an energy state in accordance with the energy-based model.

9. The system of claim 8, wherein the neural network uses a decoder and an encoder, and an output of the decoder represents the energy state.

10. The system of claim 1, wherein the performance data describes the performance of a given policy of the plurality of policies using values for the characteristics, the values generated upon executing the jobs from the queue while using the given policy to control the lifecycles of the threads for the execution of the jobs.

11. The system of claim 10, wherein the values include a first value for an average runtime of individual said jobs, a second value for an average runtime of an overall collection of said jobs, a third value for a number of active threads, and a fourth value for a number of threads in the threadpool.

12. A method implemented by a computing device, the method comprising:
receiving, by the computing device, a plurality of policies, each said policy defining respective criteria used by a job engine to control lifecycles of job executors for execution of jobs from a queue by a job execution environment of the computing device;
determining, by the computing device, which policy of the plurality of policies minimizes regret that is defined based on latency, the determining performed by an energy-based model as part of a multi-arm bandit technique using machine learning and based on one or more characteristics of the execution of the jobs from the queue resulting from using respective individual policies of the plurality of policies to control the lifecycles of the job executors for the execution of the jobs;
controlling, by the computing device automatically and without user intervention responsive to the determining, lifecycles of the job executors for execution of subsequent jobs from the queue using the determined policy;
where the job engine employs the energy-based model in utilizing the multi-arm bandit technique to reduce an energy configuration of the computing device, the energy configuration mapped to latencies, with higher energy corresponding to higher latencies, and the multi-arm bandit technique is defined such that each policy of the plurality of policies is modeled as a respective arm of a plurality of arms, with selection of a subsequent policy for controlling the lifecycles of the job executors performed by selection by the computing device of one of the plurality of arms based on exploration and exploitation, the exploration performed with a minimum probability; and
executing the subsequent jobs from the queue while using the determined policy to control the lifecycles of the job executors.

13. The method as described in claim 12, wherein the job executors are threads included as part of a threadpool, the threads defining a sequence of programmed instructions that are independently manageable as part of execution by a processing system implemented by hardware components of the job execution environment of the computing device.

14. The method as described in claim 12, wherein the job executors are memory executors included as part of a memory pool, the memory executors defining operations involving reading and writing to and from a memory system implemented by hardware components of the job execution environment of the computing device.

15. The method as described in claim 12, wherein the job executors are network executors included as part of a network pool, the network executors defining operations involving transmitting and receiving data via a network using a network system implemented by hardware components of the job execution environment of the computing device.

16. The method as described in claim 12, wherein the regret is based on latency as an amount of time used for the execution of the jobs by hardware components of the computing device in accordance with respective said policies.

17. The method of claim 12, further comprising controlling, by the computing device automatically and without user intervention, the lifecycles of the job executors for execution of the subsequent jobs from the queue using a different policy based on performing the exploration with the minimum probability.

18. A system comprising:
means for determining which policy of a plurality of policies minimizes regret that is defined based on latency, the determining performed by an energy-based model as part of a multi-arm bandit technique using machine learning and based on one or more characteristics of execution of jobs from a queue resulting from using respective individual policies of the plurality of policies to control lifecycles of job executors for the execution of the jobs, the multi-arm bandit technique defined at least in part by exploration and exploitation for determining the policy and performing the exploration with a minimum probability, each said policy defining respective criteria used by a job engine to control the lifecycles of the job executors for the execution of the jobs from the queue by a job execution environment of a computing device, the regret associated with an energy state in accordance with the energy-based model and determined using a neural network fit to performance data describing performance of the plurality of policies;
means for controlling lifecycles of the job executors for execution of subsequent jobs from the queue using the determined policy to reduce latency of the computing device associated with the execution of jobs; and
means for executing the subsequent jobs from the queue while using the determined policy to control the lifecycles of the job executors.

19. The system as described in claim 18, wherein the job executors are threads included as part of a threadpool, the threads defining a sequence of programmed instructions that are independently manageable as part of execution by a processing system implemented by hardware components of the job execution environment of the computing device.

20. The system as described in claim 18, wherein the job executors are:
- memory executors included as part of a memory pool, the memory executors defining operations involving reading and writing to and from a memory system implemented by hardware components of the job execution environment of the computing device; or
- network executors included as part of a network pool, the network executors defining operations involving transmitting and receiving data via a network using a network system implemented by hardware components of the job execution environment of the computing device.

* * * * *